United States Patent [19]
Damme et al.

[11] Patent Number: 6,040,412
[45] Date of Patent: Mar. 21, 2000

[54] PROCESS FOR PREPARING CHAIN-EXTENDED ORGANOPOLYSILOXANES

[75] Inventors: Eric Damme, Brussels, Belgium;
Jean-Marc Gilson, Midland, Mich.;
Patrick Leempoel, Brussels, Belgium;
Fabrice Lebecq, Midland, Mich.;
Takao Takemasa, Chiba, Japan

[73] Assignee: Dow Corning S.A., Seneffe, Belgium

[21] Appl. No.: 09/172,508

[22] Filed: Oct. 14, 1998

[51] Int. Cl.⁷ ..................................... C08G 77/04
[52] U.S. Cl. ................. 528/34; 528/12; 528/14; 528/17; 528/21; 528/23; 525/477
[58] Field of Search ................. 528/12, 23, 14, 528/21, 17, 34; 525/477

[56] References Cited

U.S. PATENT DOCUMENTS

| | | | |
|---|---|---|---|
| 3,133,110 | 5/1964 | Morehouse et al. | 260/448.2 |
| 4,012,375 | 3/1977 | Hahn | 528/34 |
| 4,725,643 | 2/1988 | Burkhardt | 524/789 |
| 4,835,237 | 5/1989 | Burkhardt et al. | 528/21 |
| 4,902,813 | 2/1990 | Wegehaupt et al. | 556/459 |

FOREIGN PATENT DOCUMENTS

| | | | |
|---|---|---|---|
| 0 763 556 | 3/1997 | European Pat. Off. | C08G 77/08 |
| 2 252 969 | 8/1992 | United Kingdom | C01B 21/098 |

*Primary Examiner*—Melvyn I. Marquis
*Attorney, Agent, or Firm*—Patricia M. Scaduto

[57] ABSTRACT

This specification describes and claims a process for preparing chain-extended organopolysiloxanes. The process comprises the steps of: A) mixing organopolysiloxanes having at least one silicon-bonded hydroxyl group per molecule with a polymerization catalyst to form a mixture, B) allowing the mixture of step A to react so as to produce a reaction product comprising polymerized organopolysiloxanes of which some have at least one silicon-bonded hydroxyl group per molecule and C) allowing the silicon-bonded hydroxyl group containing organopolysiloxanes of the reaction product of step B to react with a nitrogen-containing silylating agent capable of chain-extending to produce a chain-extended organopolysiloxane. Preferably the silylating agent is a cyclosilazane. Organopolysiloxanes having terminal groups other than silicon-containing hydroxyl groups and which are capable of equilibrating with the mixture of step A and/or the reaction product of step B may also be introduced prior to step C. The chain-extended organopolysiloxanes are suitable for use in sealant compositions.

14 Claims, No Drawings

PROCESS FOR PREPARING CHAIN-EXTENDED ORGANOPOLYSILOXANES

This invention relates to a process for preparing chain-extended organopolysiloxanes in particular chain extended organosiloxy-terminated organopolysiloxanes. The invention is also directed towards a process for the preparation of functional organosiloxy-terminated organopolysiloxanes.

Processes for preparing organopolysiloxanes are well known in the art. For example, it is known to prepare organopolysiloxanes by condensing low viscosity organosiloxanes, especially cyclic organosiloxanes, low viscosity siloxanols or a mixture thereof, in the presence of a catalyst. For example, organopolysiloxanes may be prepared by condensation of organosiloxanes having reactive groups at terminal silicon atoms, e.g. silicon-bonded hydroxyl groups. Organopolysiloxanes may also be made by equilibration of linear and/or cyclic organopolysiloxanes.

Organosiloxy-terminated organopolysiloxanes are usually prepared by condensation and equilibration of cyclic and/or linear organopolysiloxanes with diorganosilanols or low molecular weight organosiloxanes containing organosiloxy groups. However organosiloxy-terminated organopolysiloxanes produced by such processes may have residual silicon-bonded hydroxyl groups which are capable of condensing so that elevation of molecular weight may occur, for example, with time. This behaviour is known as crepe hardening of the organopolysiloxanes.

Various proposals have been made for methods of converting the remaining silicon-bonded hydroxyl groups into organosiloxy groups. For example, U.S. Pat. No. 3,133,110 describes a reaction between a silanol and a N-alkylsilylamine to produce a triorganosiloxy-terminated organosiloxane.

U.S. Pat. No. 4,725,643 describes a process for preparing linear triorganosiloxy-terminated organopolysiloxanes which consists essentially of condensing linear organosiloxanes having one silicon-bonded hydroxyl group in each terminal unit in the presence of a phosphonitrile chloride catalyst and thereafter reacting with hexaorganodisilazane. In this process, the hexaorganodisilazane is a silylating agent for the silicon-bonded hydroxyl groups and hence one silyl unit is added to each terminal unit of the organopolysiloxane. The silylating agent is therefore performing the function of an endcapper. The process described in U.S. Pat. No. 4,725,643 has also been carried out using a disilazane having a functional group such as a vinyl group to produce a triorganosiloxy-terminated organosiloxane having the functional group as a terminal group. The process thus can be used to produce functional triorganosiloxy-terminated organopolysiloxanes such as hydrogen or vinylsiloxy-terminated organopolysiloxanes. However, such a process is limited by the functional groups available on the silazane. The process is also particularly unsuitable for the preparation of partly functional organosiloxy-terminated organopolysiloxane where mixtures of different disilazanes are required.

It is an object of the present invention to provide a process for preparing chain-extended organopolysiloxanes from organopolysiloxanes having at least one silicon-bonded hydroxyl group per molecule by adding a nitrogen-containing silylating agent which is capable of both chain-extending and silylating the organopolysiloxanes.

Another object of the present invention is to prepare partly functional organosiloxy-terminated organopolysiloxanes by the use of only one type of silylating agent.

Still another object of the present invention is to provide chain-extended organopolysiloxanes of very high viscosity from organopolysiloxanes of lower viscosity.

According to the invention there is provided in one of its aspects a process for preparing chain-extended organopolysiloxanes which comprises the steps of:

A) mixing organopolysiloxanes having at least one silicon-bonded hydroxyl group per molecule with a polymerization catalyst to form a mixture, B) allowing the mixture of step A to react so as to produce a reaction product comprising polymerized organopolysiloxanes of which some have at least one silicon-bonded hydroxyl group per molecule and C) allowing the silicon-bonded hydroxyl group containing organopolysiloxanes of the reaction product of step B to react with a nitrogen-containing silylating agent capable of chain-extension to produce a chain-extended organopolysiloxane.

The word "comprising" where used herein is used in its widest sense to mean and to encompass the notions of "include", "comprehend" and "consist of".

The term "agent capable of chain extension" is used herein to mean a compound capable of reacting with two siloxane polymers so as to form a siloxane polymer with increased polymer chain length.

Chain-extended organopolysiloxanes produced by a process according to the invention include organosiloxy-terminated organopolysiloxanes. Organosiloxy-terminated organopolysiloxanes are well known in the art and have been described in many patent applications. Full description of all options is therefore not included but additional details can be found for example, in U.S. Pat. No. 4,725,643 and U.S. Pat. No. 4,835,237. The chain-extended organopolysiloxanes are preferably organosiloxy-terminated organopolysiloxanes having the general formula (I):

$$R'_3Si(OSiR_2)_pOSiR'_3 \qquad (I)$$

In formula (I), each R is the same or different and denotes a hydrogen, a monovalent hydrocarbon having 1 to 18 carbon atoms, a halogenated hydrocarbon group having 1 to 18 carbon atoms or a cyanoalkyl group; each R' is the same or different and denotes a hydroxyl group, a hydrogen, a monovalent hydrocarbon having 1 to 8 carbon atoms, a halogenated hydrocarbon having 1 to 8 carbon atoms or an alkenyl group having 2 to 8 carbon atoms; p is an integer having a value of from 1 to 2500. Preferably R is an alkyl group having from 1 to 8 carbon atoms or a phenyl group and more preferably a methyl group. Preferably R' is an alkyl group having from 1 to 6 carbon atoms, a hydrogen atom, a phenyl group or an alkenyl group having from 2 to 6 carbon atoms and more preferably a hydrogen atom, methyl group or vinyl group.

Examples of chain-extended organopolysiloxanes made by a process according to the invention are organopolysiloxanes terminated with trialkylsiloxy e.g. trimethylsiloxy, alkenyldialkylsiloxy e.g. vinyldialkylsiloxy such as vinyldimethylsiloxy, hydrogendialkylsiloxy groups e.g. hydrogendimethylsiloxy or mixtures thereof. A process according to the invention is particularly suitable for preparing organosiloxy-terminated organopolysiloxanes having more than one type of organosiloxy end-group, for example, organosiloxy-terminated organopolysiloxane partly terminated with hydrogendialkylsiloxy groups and partly terminated with trialkylsiloxy groups and organosiloxy-terminated organopolysiloxane partly terminated with vinyldialkylsiloxy groups and partly terminated with trialkylsiloxy groups.

In step A of a process according to the invention, organopolysiloxanes having at least one silicon-bonded hydroxyl group per molecule are mixed with a polymerization catalyst to form a mixture. Organopolysiloxanes having terminal silicon-bonded hydroxyl groups are particularly suitable for use in step A of a process according to the invention. These include, for example, organopolysiloxanes having the general formula (II):

(II)

In formula (II), R" is the same or different and denotes a monovalent hydrocarbon group preferably having 1 to 18 carbon atoms or halogenated hydrocarbon group preferably having 1 to 18 carbon atoms and m is an integer having a value of from at least 2. Preferably R" denotes an alkyl group having from 1 to 6 carbon atoms and more preferably a methyl group. The value of m is preferably such that the average viscosity of the organopolysiloxanes prior to mixing with the catalyst does not exceed 200 mPa.s at 25° C.

Organopolysiloxanes having terminal silicon-bonded hydroxyl groups are well known in the art and are commercially available. They can be made by techniques known in the art, for example, by hydrolysis of a chlorosilane, separation of the linear and cyclic material produced by the hydrolysis, and subsequently polymerizing the linear material.

A process according to the invention preferably employs organopolysiloxanes having one silicon-bonded hydroxyl group in each terminal group and wherein at least 80% of the R" groups denote a methyl group.

In step A of a process according to the invention a polymerization catalyst is mixed with the organopolysiloxanes having at least one silicon-bonded hydroxyl group. Catalysts suitable for use in step A are, for example, sulphuric acid, hydrochloric acid, phosphoric acid, trifluoromethanesulfonic acid, sodium hydroxide, potassium hydroxide, tetra-methylammonium hydroxide, tetrabutylphosphonium silanoate, amines and phosphonitrile halide such as a phosphonitrile of the general formula:

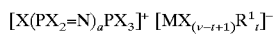

wherein X denotes a halogen atom preferably chlorine, M is an element preferably having an electronegativity according to Pauling's scale of from 1.0 to 2.0, $R^1$ is an alkyl group having up to 12 carbon atoms, a has a value of from 1 to 6, v is the valence or oxidation state of M and $v < t \geq 0$. Suitable elements for M are found in Groups Ib, IIa, IIb, IIIa, IVa, IVb, Va, Vb, VIIb and VIII of the periodic table, e.g. Al, B, Be, Mg, Sb and Si. Phosphonitrile catalysts and methods for their preparation are described in U.S. Pat. No. 4,725,643, EP 319,978 and GB 2,252,969. Preferably the catalyst is an acidic polymerization catalyst, more preferably the catalyst is an acidic phosphazene polymerization catalyst and most preferably the catalyst is $Cl_3P(NPCl_2)_aNPCl_3^+.PCl_6$ wherein a is equal to 1 to 6 preferably 1 or 2 and more preferably 1. The catalyst is preferably added at a concentration of from 5 to 100 ppm based on the total weight of organopolysiloxanes having at least one silicon-bonded hydroxyl group present in the mixture of step A.

In step B of a process according to the invention the mixture of step A is allowed to react so as to produce a reaction product comprising polymerized organopolysiloxanes of which some have at least one silicon-bonded hydroxyl group per molecule. The reaction is preferably via a condensation and/or equilibration reaction and preferably the resultant mixture of organopolysiloxanes has a higher viscosity than the initial viscosity of the mixture of step A.

In step C of a process according to the invention, the silicon-bonded hydroxyl group containing organopolysiloxanes of the reaction product of step B are allowed to react with a nitrogen-containing silylating agent capable of chain extension to produce a chain-extended organopolysiloxane. The term "nitrogen-containing silylating agent" as used herein means a nitrogen-containing organosilicon compound which can add onto a chemical compound preferably a polymer. Nitrogen-containing silylating agents preferably have a silicon-nitrogen bond. Therefore a nitrogen-containing silylating agent capable of chain extension must be capable of reacting with two siloxane polymers to link them together via a silicon-containing group which originates from said silylating agent. Examples of suitable silylating agents required for the invention include silyl carbamates, silyl acetamides and cyclosilazanes. The silylating agent is preferably a cyclosilazane such as, for example, hexamethylcyclotrisilazane, octamethylcyclotetrasilazane or decamethylcyclopentasilazane and is more preferably hexamethylcyclosilazane. Such cyclosilazanes are well known in the art and can be prepared by condensation from monomeric aminosilane.

We have discovered that by adding a nitrogen-containing silylating agent capable of chain extension to the reaction product of step B, we eliminate the remaining hydroxyl groups on the reaction product by a silylation reaction and we also produce a chain extension of the reaction product of step B and, thereby, increase the viscosity of the product. Moreover, if a cyclosilazane such as hexamethylcyclotrisilazane is used in a process according to the invention, $NH_3$ is produced which can neutralize the polymerization catalyst used in step A particularly where the catalyst is an acidic phosphazene polymerization catalyst.

The present process may be conducted batch-wise, semi-continuously, or as a continuous process. It is preferred to conduct the reaction as a continuous process. It is advantageously carried out at a temperature, for example, within the range from 50 to 220° C., preferably 150 to 200° C. It is also preferred to conduct the reaction in a polymerization reactor equipped with heating and spray device facilities as described, for example, in U.S. Pat. No. 5,504,150.

In a process according to the invention, at least one additional organopolysiloxane having terminal groups other than silicon-bonded hydroxyl groups and which is capable of equilibrating with the mixture of step A and/or the reaction product of step B is optionally introduced prior to step C. Suitable organopolysiloxanes include organopolysiloxanes having the general formula (III):

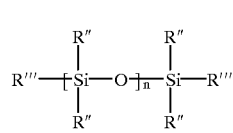

(III)

wherein R" is as above and each R'" is the same or different and represents, for example, a hydrogen atom, a hydrocarbon having 1 to 8 carbon atoms or a halogenated hydrocarbon having 1 to 8 carbon atoms preferably R'" is an alkyl group having 1 to 6 carbon atoms or an alkenyl group having 2 to 6 carbon atoms, a hydrogen atom or a phenyl group and more preferably a hydrogen atom, methyl group or vinyl group and n is an integer having a value of at least 1.

Preferably at least one R''' group is a hydrogen atom. By the use of an organopolysiloxane having at least one silicon-bonded hydrogen atom per terminal group in combination with an organopolysiloxane having at least one silicon-bonded hydroxyl group in a process according to the invention, a chain-extended organopolysiloxane end-blocked with silicon-bonded hydrogen atoms may be provided at step C. Preferably the additional organopolysiloxane has terminal groups selected from silicon-bonded hydrogen atoms, silicon-bonded vinyl groups and silicon-bonded methyl groups.

An example of a process for preparing chain-extended organopolysiloxanes according to the invention comprises the use of a polymerization reactor equipped with heating, cooling and spray-drying facilities. The reactor comprises a spray dryer having a reagent inlet means, a reactor chamber and an outlet means. The reagent means also comprising a mixing device for admixing a catalyst at required proportions. Organopolysiloxanes having terminal silicon-bonded hydroxyl groups and optionally organopolysiloxanes having terminal groups capable of equilibrating with the organopolysiloxanes are mixed with a catalyst before feeding (via a spray device) into the reactor chamber. The catalyst is preferably added at a concentration of, for example 5 to 100 ppm based on the total weight of organopolysiloxane having terminal silicon-bonded hydroxyl groups and preferably at a concentration of 15 to 50 ppm. A pressurized gas is supplied through the heating means and is fed into the reactor at a temperature of, for example, between 50 and 220° C., preferably about 200° C. The pressurized gas may be any inert gas such as air or nitrogen and is supplied at a pressure varying between, for example, 10 and 2000 kPa, preferably about 300 kPa. At the outlet of the reaction chamber, the reaction product resulting from the organopolysiloxane/catalyst mixture is mixed with a nitrogen-containing sily-lating agent capable of chain extension and the resulting mixture is then reacted to produce a chain-extended organopolysiloxane.

A process according to the invention has an advantage of producing a moderate viscosity organopolysiloxane in Step B (for example, from 300 to 300,000 mPa.s at 25° C. and preferably 2,000 to 80,000 mPa.s) with low energy of mixing followed by a higher viscosity chain-extended organopolysiloxane in step C. Moreover, the process of step C can produce chain-extended organopolysiloxanes with a wide diversity of viscosities (for example, 500 to 3,000,000 mPa.s at 25° C.) by the addition of a nitrogen-containing silylating agent which is capable of chain-extension.

Chain-extended organopolysiloxanes prepared in accordance with the present invention are useful for all purposes known heretofore for organosiloxy-terminated organopolysiloxanes produced by previous methods. Organopolysiloxanes produced by a process according to the invention may be used, for example, as thread lubricants, in the formation of organopolysiloxane elastomers which are crosslinked by condensation reactions or by addition reactions of silicon-bonded vinyl groups to silicon-bonded hydrogen groups.

The following examples are included for illustrative purposes only and should not be construed as limiting the invention which is properly set forth in the appended claims. All parts are expressed by weight and all viscosities are measured at 25° C.

EXAMPLE 1

Process for Preparing Vinyldimethylsiloxy-terminated Polydimethylsiloxane

Step 1

The following reagents were continuously fed into a polymerization reactor as described above and at a temperature of 170° C. A polydimethylsiloxane having terminal silicon-bonded hydroxyl groups and a viscosity of 70 mPa.s at a rate of 200 kg/hour, a vinyl terminated polydimethylsiloxane having a viscosity of 5 mPa.s at a rate of 4.38 kg/hour and 20 ppm of a $Cl_3P(NPCl_2)$ $NPCl_3^+.PCl_6^-$ catalyst. An air flow of 250 $Nm^3$/hour at a temperature of 200° C. was also maintained in the polymerization reactor. The reagents were reacted to form a vinyldimethylsiloxy-terminated polydimethylsiloxane.

Step 2

Hexamethylcyclotrisilazane was added to the reaction product of Step 1 (i.e. vinyldimethylsiloxy-terminated polydimethylsiloxane) at the outlet of the polymerization reactor at an addition rate of 4 ml/minute and the resulting mixture was then fed back into the polymerization reactor by a recirculation loop and further polymerized to form a vinyldimethylsiloxy-terminated polydimethylsiloxane having a viscosity of 37,747 mPa.s. The absence of silicon-bonded hydroxyl groups in the vinyldimethylsiloxy-terminated polydimethylsiloxane of Step 2 was determined by an OH index test.

The OH index test was taken as the measure of the following ratio:

OH index=viscosity of mixture I before reaction/viscosity of mixture I after reaction wherein mixture I=118.5 g of vinyldimethylsiloxy-terminated polydimethylsiloxane produced in Step 2 with 0.25 g of a methyl hydrogen siloxane having a viscosity of 20 mPa.s and 1.25 g of di-n-butyltin dilaurate. Mixture I was allowed to react for 30 minutes at 100° C.

The mixture had an OH index of 0.73 and did not form an elastomer indicating that the remaining hydroxyl groups in the vinyldimethylsiloxy-terminated polydimethylsiloxane of Step 2 was lower than 50 ppm.

EXAMPLE 2

Process for Preparing Hydrogendimethylsiloxy-terminated Polydimethylsiloxane

The procedure as described in Example 1 was repeated with the following reaction conditions:

1. Polydimethylsiloxane having terminal silicon-bonded hydroxyl groups and a viscosity of 70 mPa.s at a rate of 300 kg/hour,
2. Hydrogen-terminated polydimethylsiloxane having 0.16% silicon-hydrogen bonds and a viscosity of 10 mPa.s at a rate of 5.9 kg/hour,
3. 20 ppm of $Cl_3P(NPCl_2)$ $NPCl_3^+.PCl_6^-$ catalyst,
4. Hexamethylcyclotrisilazane at a rate of 6 ml/hour, and
5. Air flow at a rate of 258 $Nm^3$/hour at 200° C.

The resultant hydrogendimethylsiloxy-terminated polydimethylsiloxane had a viscosity of 120,000 mPa.s and an OH index of 0.85.

EXAMPLE 3

Process for Preparing Partly Hydrogendimethylsiloxy-terminated Polydimethylsiloxane The procedure as described in Example 1 was repeated with 1. Polydimethylsiloxane having terminal silicon-bonded hydroxyl groups and a viscosity of 70 mPa.s at a rate of 300 kg/hour, 2. A blend of a hydrogendimethyl-terminated polydimethylsiloxane having 0.16% silicon-hydrogen bonds and a viscosity of 10 mPa.s and a trimethylsiloxy-terminated polydimethylsiloxane having a viscosity of 10 mPa.s in a ratio 2.4/0.6 and at a rate of 9 kg/hour, 3. 20 ppm of $Cl_3P(NPCl_2)$ $NPCl_3^+.PCl_6^-$ catalyst, and 4. Hexamethylcyclotrisilazane at a rate of 6 ml/min.

The resultant partly hydrogendimethylsiloxy-terminated polydimethylsiloxane had 78% active hydrogendimethylsiloxy terminal groups of the total end-groups present in the mixture and a viscosity of 20,000 mPa.s.

EXAMPLE 4

Process for Preparing Hydrogendimethylsiloxy-terminated Polydimethylsiloxane

The procedure described in Example 1 was repeated in order to illustrate the viscosity increase of the hydrogendimethylsiloxy-terminated polydimethylsiloxane obtained in step 1 upon addition of hexamethylcyclotrisilazane.

The procedure of Example 1 was repeated using the following reaction conditions:

1. Polydimethylsiloxane having terminal silicon-bonded hydroxyl groups and a viscosity of 70 mPa.s at a rate of 100 kg/hour, 2. Hydrogendimethyl-terminated siloxane with 0.15% silicon-hydrogen bonds and a viscosity of 11 mPa.s at a rate of 2.63 kg/hour, 3. 20 ppm of $Cl_3P(NPCl_2)$ $NPCl_3^+.PCl_6^-$ catalyst, 4. Air flow at a rate of 350 $Nm^3$/hour.

After completion of step 1, a hydrogendimethylterminated polydimethylsiloxane having a viscosity of 54,600 mPa.s was formed. After addition of 1 ml/min of hexamethylcyclotrisilazane, the viscosity of the hydrogendimethylterminated polydimethylsiloxane increased to 79,000 mPa.s with an OH index of 0.56.

That which is claimed is:

1. A process for preparing chain-extended organopolysiloxanes which comprises the steps of:

A) mixing organopolysiloxanes having at least one silicon-bonded hydroxyl group per molecule with a polymerization catalyst to form a mixture;

B) allowing the mixture of step A to react so as to produce a reaction product comprising polymerized organopolysiloxanes of which some have at least one silicon-bonded hydroxyl group per molecule; and C) allowing the silicon-bonded hydroxyl group containing organopolysiloxanes of the reaction product of step B to react with a nitrogen-containing silylating agent capable of chain-extension to produce a chain-extended organopolysiloxane.

2. A process according to claim 1 wherein the silylating agent is a cyclosilazane.

3. A process according to claim 1 wherein the silylating agent is hexamethylcyclotrisilazane.

4. A process according to claim 1 wherein organopolysiloxanes having terminal silicon-bonded hydroxyl groups are present in the mixture of step A.

5. A process according to claim 1 wherein the polymerization catalyst is a phosphazene catalyst.

6. A process according to claim 1 wherein the polymerization catalyst is $Cl_3P(NPCl_2)_a NPCl_3^+.PCl_6^-$ and a has a value of from 1 to 6.

7. A process according to claim 1 wherein the chain-extended organopolysiloxane is selected from the group consisting of an hydrogendialkylsiloxy-terminated organopolysiloxane and a vinyldialkylsiloxy-terminated organopolysiloxane.

8. A process according to claim 1 wherein the chain-extended organopolysiloxane is partly terminated with trialkylsiloxy groups and partly terminated with hydrogendialkylsiloxy groups.

9. A process according to claim 1 wherein the chain-extended organopolysiloxane is partly terminated with trialkylsiloxy groups and partly terminated with vinyldialkylsiloxy groups.

10. A process according to claim 1 wherein at least one additional organopolysiloxane having terminal groups other than silicon-bonded hydroxyl groups and which is capable of equilibrating with the mixture of step A is introduced prior to step C.

11. A process according to claim 10 wherein the additional organopolysiloxane comprises an organopolysiloxane having terminal groups selected from group consisting of silicon-bonded hydrogen atoms, silicon-bonded vinyl groups and silicon-bonded methyl groups.

12. A process according to claim 1 wherein at least one additional organopolysiloxane having terminal groups other than silicon-bonded hydroxyl groups and which is capable of equilibrating with the reaction product of step B is introduced prior to step C.

13. A process according to claim 12 wherein the additional organopolysiloxane comprises an organopolysiloxane having terminal groups selected from group consisting of silicon-bonded hydrogen atoms, silicon-bonded vinyl groups and silicon-bonded methyl groups.

14. A chain-extended organopolysiloxane produced by a process comprising the steps of:

A) mixing organopolysiloxanes having at least one silicon-bonded hydroxyl group per molecule with a polymerization catalyst to form a mixture;

B) allowing the mixture of step A to react so as to produce a reaction product comprising polymerized organopolysiloxanes of which some have at least one silicon-bonded hydroxyl group per molecule; and C) allowing the silicon-bonded hydroxyl group containing organopolysiloxanes of the reaction product of step B to react with a nitrogen-containing silylating agent capable of chain-extension to produce a chain-extended organopolysiloxane.

* * * * *